June 8, 1937.  J. A. MARLAND  2,082,842
ONE-WAY CLUTCH
Filed Oct. 7, 1935  3 Sheets-Sheet 1
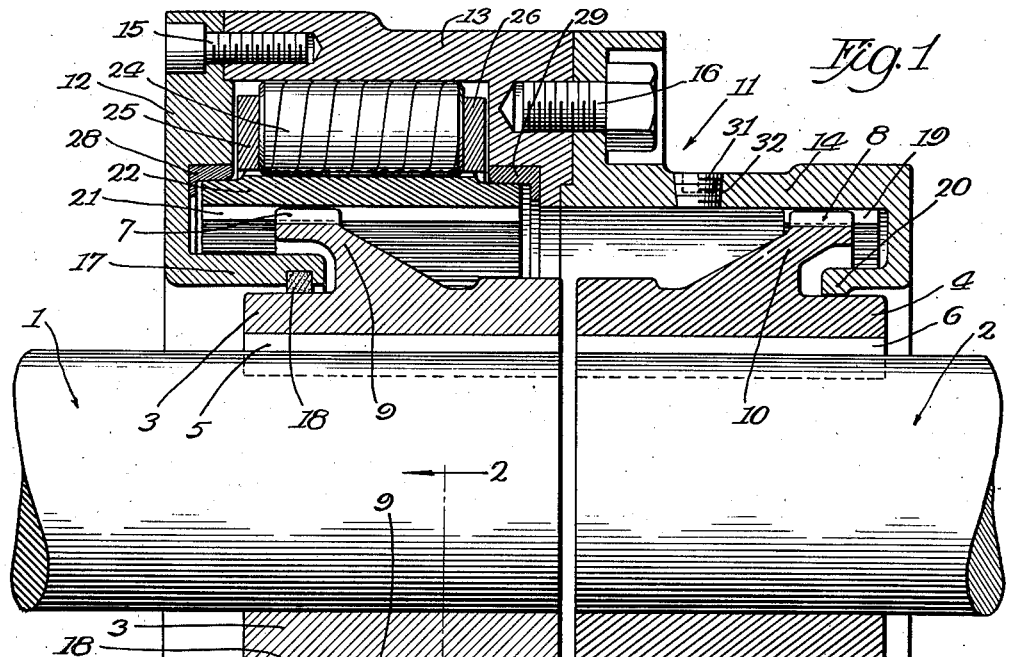
Fig. 1
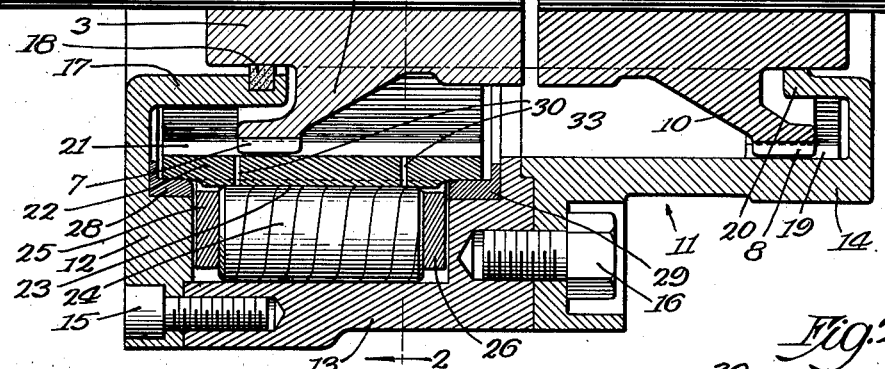
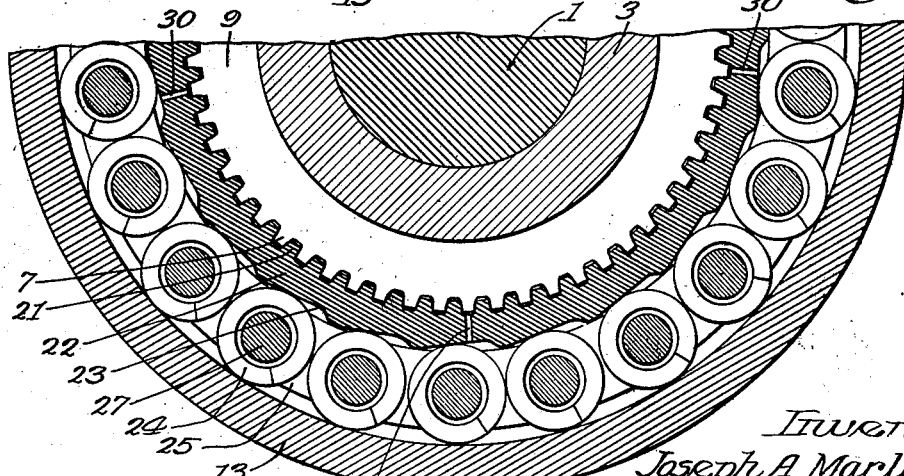
Fig. 2
Inventor:
Joseph A. Marland
By J. Clarke Hagey, Atty.

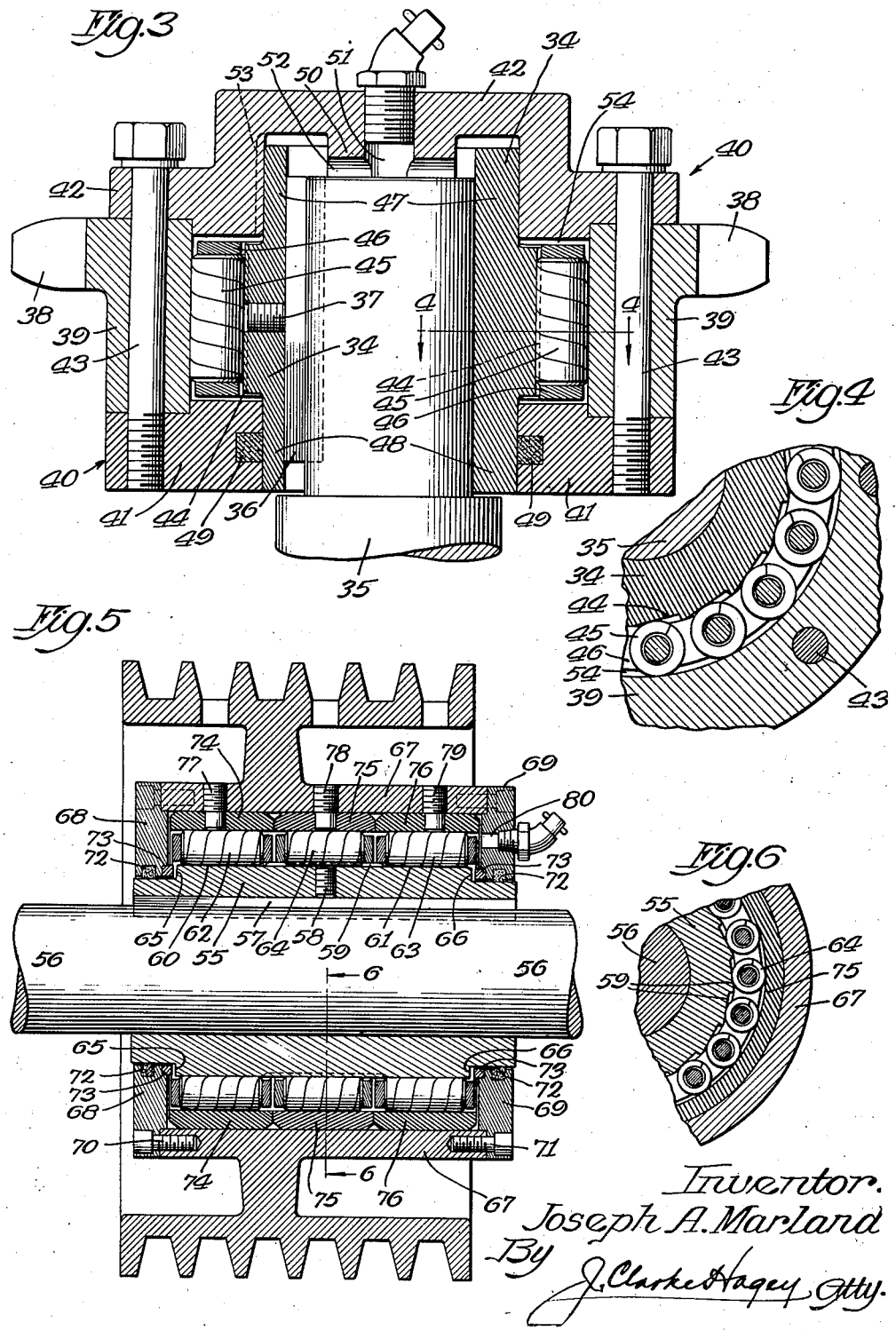

June 8, 1937.  J. A. MARLAND  2,082,842
ONE-WAY CLUTCH
Filed Oct. 7, 1935  3 Sheets-Sheet 3

Inventor:
Joseph A. Marland
By J. Clarke Hagey, Atty.

Patented June 8, 1937

2,082,842

UNITED STATES PATENT OFFICE 2,082,842

ONE-WAY CLUTCH

Joseph A. Marland, La Grange, Ill.

Application October 7, 1935, Serial No. 43,834

8 Claims. (Cl. 192—45)

My invention relates to improvements in clutches, and more particularly concerns the construction of one-way or overrunning clutches, adapted for many and various applications and uses in both light and heavy machinery.

While the general purpose of the invention is to provide a sturdy and reliable clutch construction in which the driving strain is scientifically distributed to equalize stresses upon the various clutch-members and afford very low unit stresses upon the working parts, particular attention has been given to other important features and details, providing for quick action and release, proper distribution of lubrication, accessibility, and the avoidance of jamming, wedging, distortion, and undue wear and scoring of the various elements.

I have shown and will describe several applications of the invention and some modifications in the construction, but it is to be understood that the invention is not limited to such applications, and that other modifications and adaptations may be made without departing from the spirit and scope of the claims appended hereto.

In the drawings—

Figure 1 is a longitudinal sectional view, showing one embodiment of the invention in what is known as a self-aligning shaft-coupling;

Fig. 2 is a fragmentary sectional view, taken upon the line 2—2 of Fig. 1;

Fig. 3 is a vertical sectional view, showing an embodiment of the invention in a clutch-sprocket, as applied to a vertical shaft;

Fig. 4 is a fragmentary sectional view, taken upon the line 4—4 of Fig. 3;

Fig. 5 is a longitudinal sectional view, showing another embodiment of the invention in a clutch-sheave;

Fig. 6 is a fragmentary sectional view, taken upon the line 6—6 of Fig. 5;

Figure 7:
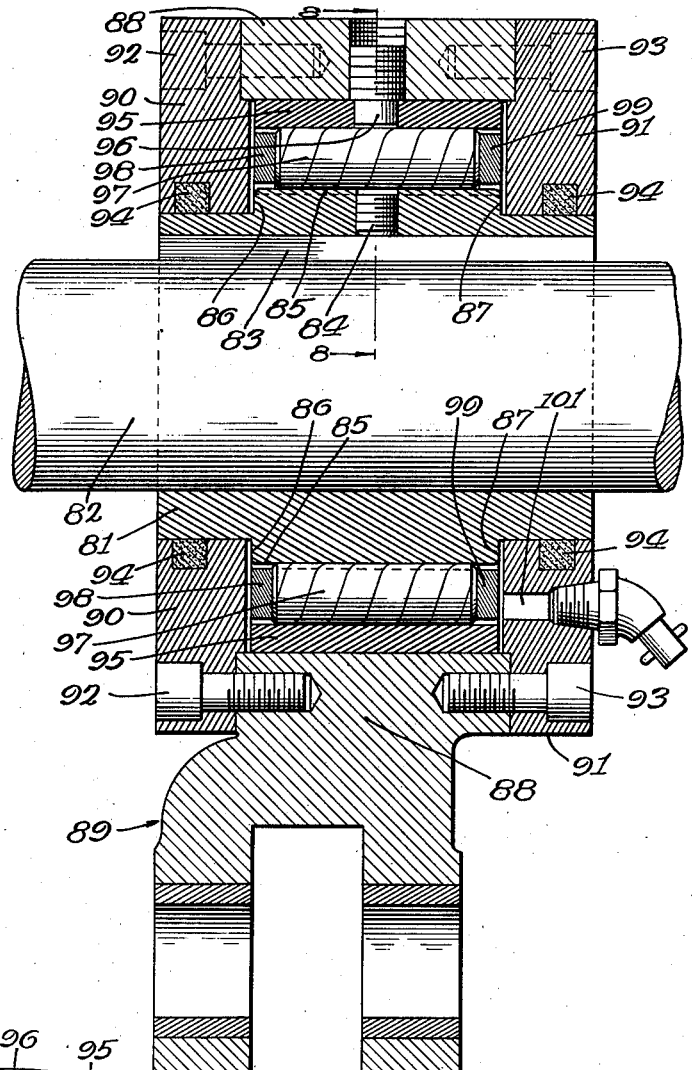
Fig. 7 is a vertical sectional view, showing still another embodiment of the invention in a clutch-ratchet.
Figure 8:
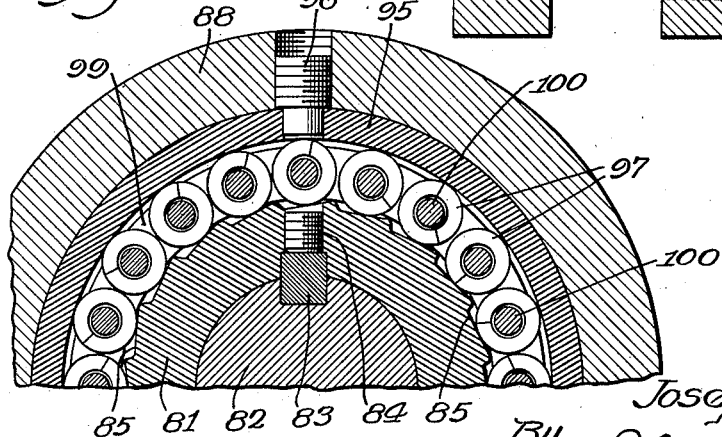
Fig. 8 is a fragmentary sectional view, taken upon the line 8—8 of Fig. 7.

Each of the four clutch arrangements shown in the drawings may be employed, of course, for a variety of purposes. For example, those shown in Figures 1 to 6, inclusive, are adapted for use in one-way-drives for power-driven vehicles, such as free-wheeling devices for automobiles; in harvesting machines, street-sweepers, and other machines of such types, in which parts thereof are to be operated in one direction only, or when the machine is moving in one direction only, and the driving of such parts is effected by one or more of the ground-wheels of the machine; and in various kinds of stationary machinery in which a plurality of driving units are coupled with a single driven unit, such as where a gas or steam engine and an electric motor are selectively employed for driving a pump, or in which a single reversible driving unit is coupled with a plurality of driven units, such as where a reversible electric motor is used for driving one or the other of a pair of pumps, depending upon the direction of rotation of said motor. The arrangement shown in Figures 7 and 8 is designed for translating reciprocal or oscillatory motion into intermittent uni-directional rotary motion, and is particularly adapted for use in operating printing press inking rollers, metal punch-press strip feed-rolls, stoker-feed-drives, and so forth.

Considering, first, the construction illustrated in Figures 1 and 2, in which my one-way clutch is embodied in a self-aligning shaft-coupling, it may be explained that, while the end-parts of shafts 1 and 2 are here shown in axial alignment, the clutch-coupling construction is designed to compensate for misalignment of the shafts and to prevent the transmission of angular stresses and vibrations therebetween. In the end-to-end coupling of shafts, the axes of the shafts may not be, or may not remain, in perfect alignment. Furthermore, the operating vibrations of the driving and driven units, to which the respective shafts belong, may differ in period or extent, and where such conditions pertain in the coupling of the shafts of heavy and/or high-speed machinery, considerable damage may result, unless provision is made to avoid the placing of dangerous strains or stresses upon the coupled shafts and their bearings and to prevent the transmission of vibrations between the coupled units. Such provision is even more necessary where a self-acting clutch is employed, since any misalignment of the clutch-elements would prevent their proper operation, to say the least.

Similar hubs 3 and 4 are tightly fitted upon the proximate end-parts of shafts 1 and 2, respectively, are keyed thereupon, as at 5 and 6, and are each provided with a continuous series of external splines, 7 and 8, formed upon the rims of respective dished or undercut annular flanges 9 and 10. The hubs are boxed by the cylindrical coupling 11, the casing of which is formed of members 12, 13 and 14, firmly secured together by screw-bolts 15 and 16. Member 12 is a cover-plate having an inwardly turned sleeve 17 fitted with a packing-ring 18, which engages hub 3 in the annular recess beneath the splines 7 thereof and serves as an oil-seal for this end of the coupling. Member 13 surrounds and provides an outer roller-race for other clutch-members to be presently described, and member 14 constitutes a sleeve-cap having an open end surrounded by an annular cup and a continuous series of internal splines 19, the splines 19 meshing with splines 8, and the inwardly turned lip 20 of the cup forming a bearing ring and serving as an oil-seal for this end of the coupling, engaging hub 4 in the annular recess beneath splines 8 approximately on the transverse center line of said splines.

Splines 7 mesh with a continuous series of internal splines 21 formed upon the inner face of a cylindrical cam-unit 22, the outer surface of which is formed with a continuous series of cam-faces 23. Acting between these cam-faces and the smooth inner surface of member 13 is a series of clutch-rollers 24, which are guided and retained in proper relationship with their respective cam-faces by a roller-cage, here shown as comprising a pair of cage-rings, 25 and 26, connected together by tie-rods 27. Preferably, rollers 24 are hollow and are loosely journaled upon the tie-rods 27, to form a unitary roller-cage assembly. The rollers are formed of helically wound square steel bars, to provide a certain degree of resilience in their action, their ends are ground at right angles to their axes, and their length is such that they fit nicely but freely between the cage-rings 25 and 26. Cam-unit 22 is fitted to turn freely in bushing-rings 28 and 29, and cage-rings 25 and 26 have only a limited clearance over the outside diameter of the cam-unit, thus preventing excessive motion of the axis of the roller-cage about the shaft axis.

While my invention is not limited to this particular roller and roller-cage construction, I find that, by making the rollers hollow and journaling them loosely, as I have described, the use of a lubricant of the proper viscosity will, upon operation of the device, exert sufficient fluid friction upon the rollers to float them into and from their engaging positions, without destructive rubbing, wear and noise, and the use of the usual roller-urging springs is unnecessary. By constructing the rollers of helically wound steel bars, they may be made sufficiently light for the purposes just mentioned and yet strong enough to prevent crushing by compression when in their engaged positions, and by fitting them nicely between the cage-rings as I have described, they will be held square with the sides of the cage and in proper alignment with their respective cam-faces and the outer raceway with which they engage.

In the embodiment of the invention just described, driven shaft 2 will be rotated in one direction by driving shaft 1 through coupling 11, by means of hub 3, splines 7 and 21, cam-unit 22, clutch-rollers 24, members 13 and 14, splines 19 and 8, and hub 4. Whenever the forward rotative speed of shaft 2 exceeds or overruns that of shaft 1, as would occur at times in the use of the shaft-clutch-coupling in free-wheeling devices, coupling 11, being connected to shaft 2 by splines 19 and 8 and hub 4, will be rotated at greater speed than cam-unit 22, which is connected to shaft 1 by splines 21 and 7 and hub 3. Clutch-rollers 24 will therefore be released from their gripping engagement between the outer raceway, formed by the smooth inner surface of the cylindrical member 13, and their respective cam-faces 23, and the viscosity of the lubricant employed will offer sufficient fluid friction upon them to back them into the recesses of the cam-unit, out of contact with the raceway. Of course, the same action takes place upon reversing the direction of rotation of shaft 1, as would occur in many of the other mentioned uses of the shaft-clutch-coupling. Similarly, whenever the forward rotative speed of shaft 1 exceeds that of shaft 2, the viscosity of the lubricant employed will retard the rotation of the rollers and the roller-cage sufficiently to effect the movement of the rollers up the inclined surfaces of their respective cam-faces into gripping engagement with the aforesaid outer raceway.

An important feature of this invention lies in the means provided for insuring proper distribution of lubrication. I have mentioned that the use of a lubricant of proper viscosity will, upon operation of the device, exert sufficient fluid friction upon the rollers to influence them into and from their gripping engagement with their respective cam-faces and the outer roller raceway formed by the smooth inner surface of member 13, and it follows that, in order for all of the rollers to be so influenced, the lubricant must be retained in the raceway and be prevented from draining or settling away from the upper rollers when the device is not in operation. It will be observed that the roller raceway constitutes a closed annular channel, three sides of which are formed by members 12 and 13, and the fourth by the cam-unit 22, which is fitted to turn freely but closely within the bushing-rings 28 and 29, and that cam-unit 22 is perforated at intervals by lubrication-ducts 30, 30. After the device has been completely assembled, the plug 31 is removed from the oil-hole 32 and sufficient lubricant is introduced therein to fill the space 33 in the lower part of the casing up to the level of the oil-seals formed by the packing ring 18 and the lip 20, as indicated by the dotted line on Figure 1. The device is then operated long enough for the lubricant to be impelled by centrifugal force through the lubrication-ducts 30, 30, into the raceway. More lubricant is then added and the aforesaid operation repeated until the raceway is completely filled and the space 33 is also filled up to the level of the aforesaid dotted line shown on Figure 1.

The degree of viscosity of the lubricant is determined by the speed at which the device is to be run, and the diameter of the lubrication-ducts 30, 30, is determined by the degree of viscosity of the lubricant, that is to say, the diameter of said ducts is such that the lubricant of proper viscosity will pass outwardly therethrough into the raceway when impelled by centrifugal force during operation of the device, but will not return therethrough by simple gravitation when the device is not in operation, because of the fluid friction thereof against the sides of the ducts, or, otherwise expressed, because of the viscous property possessed by the lubricant of resisting deformation. It will thus be evident that all of the contacting surfaces of the operating parts, including the splines 7, 8, 19 and 21, will be kept thoroughly lubricated at all times. Experience has proven that the importance of this feature of proper-lubrication cannot be over-emphasized.

In the applications of the invention and the modifications in the construction illustrated in the remaining figures of the drawings, the cam-units are not formed with the internal series of splines nor provided with the lubrication-ducts I have just described, since, in each of the devices shown in these figures, the clutch acts upon a single shaft and the cam-unit is fitted and removably secured in position directly thereupon.

Referring, now, to the clutch-sprocket construction shown in Figures 3 and 4, the cam-unit is in the form of a sleeve 34 fitted upon the reduced end-part of shaft 35, being held from turning thereupon by the feather or key 36, and removably secured in position by the set-screw 37. The sprocket-teeth 38 are formed upon the outer surface of the cylindrical intermediate member 39 of the clutch-casing 40, the two other members of said clutch-casing being the inner cover-plate 41 and the outer or end cap-plate 42, all secured together by screw-bolts 43 which are passed through members 42 and 39 and screwed into member 41. The inner surface of member 39 is ground smooth and true and forms the outer roller-race, between which and the cam-faces 44 of cam-sleeve 34 the clutch-rollers 45 and the roller-cage 46 are located. Clutch-rollers 45 and roller-cage 46 are substantially the same in construction and operation as the clutch-rollers 24 and the roller-cage described in connection with Figures 1 and 2, but the cam-faces 44 do not extend entirely across the outer surface of cam-sleeve 34. As shown in Figure 3, the outer diameter of the opposite end-parts 47 and 48 of cam-sleeve 34 is less than that of the intermediate band of cam-faces 44, these end-parts being ground smooth and true to serve as bearings for the cover-plate 41 and cap-plate 42, respectively. Cover-plate 41 is provided with a packing-ring 49 to serve as an oil-seal. Cap-plate 42 is formed with an internal central boss 50 which bears against the end of shaft 35, and is provided with a central oil-hole 51 and connecting lubrication-ducts in the form of grooves 52 and 53, through which lubrication is supplied to the roller raceway 54.

In the clutch-sheave construction illustrated in Figures 5 and 6, the cam-unit is again in the form of a sleeve 55, here shown fitted upon a through shaft 56 and held removably fixed and positioned thereupon by a spline or key 57 and a set-screw 58. Cam-faces 59 are formed as a central band between two smoothly ground surfaces 60 and 61, which, in this instance, constitute inner races for respective sets of anti-friction rollers 62 and 63, located one at each side of the set of clutch-rollers 64. The end-parts of cam-sleeve 55 are also smoothly ground, but of smaller diameter than surfaces 60 and 61, forming annular shoulders 65 and 66. The hollow cylindrical hub 67 of the sheave forms the intermediate member of the casing enclosing the clutch and idler roller-assemblies, the two outer members of said casing being the cover-plates 68 and 69 which are removably secured to the opposite ends of the hub by screw-bolts 70 and 71 respectively. Cover-plates 68 and 69 are alike and are fitted to run upon the smooth end-parts of cam-sleeve 55, each being provided with an oil-seal packing-ring 72 and with an inner bushing 73, the bushings projecting sufficiently from the inner faces of the respective cover-plates to act as end-thrust bearings against the corresponding adjacent shoulders 65 and 66. Separate hardened and smoothly ground sleeves 74, 75 and 76 are pressed or otherwise tightly fitted within the hub 67 and held in position by respective screw-pins 77, 78 and 79, constituting outer races for the two sets of anti-friction rollers 62 and 63 and the intermediately positioned set of clutch-rollers 64. The three sets of rollers are assembled upon individual roller-cages to form separately removable units, and the construction of rollers and roller-cages may be alike and substantially similar to that of the rollers and the roller-cage described in connection with Figures 1 and 2. Lubrication is introduced into the raceway through oil-hole 80.

It is believed that a description of the operation of the clutch-sprocket construction, shown in Figures 3 and 4, is unnecessary, but it may be mentioned that either the sprocket or the shaft may be used as the driving member of the clutch. Similarly, in the clutch-sheave construction shown in Figures 5 and 6, the sheave may be employed either as the driving or the driven member of the clutch. Viewing it as the driving member, rotation thereof in one direction will effect gripping engagement of the clutch-rollers 64 between the inclined surfaces of cam-faces 59 and the respective outer race 75 to drive the shaft 56. Whenever the rotative speed of the shaft exceeds or overruns that of the sheave, or whenever the direction of rotation of the sheave is reversed, the clutch-rollers will be automatically released from their gripping engagement and the sheave will idle upon the two sets of anti-friction rollers 62 and 63.

In the clutch-ratchet construction shown in Figures 7 and 8, the cam-unit, clutch-rollers and roller-cage arrangements are substantially the same as those described in connection with the clutch-sprocket construction of Figures 3 and 4. Cam-sleeve 81 is fitted upon shaft 82, and is held removably fixed and positioned thereupon by spline or key 83 and set-screw 84. Cam-faces 85 are formed as a central band upon the outer surface of cam-sleeve 81, between smoothly ground surfaces at the opposite end-parts thereof, said end-parts being of smaller diameter than the band of cam-faces to form annular shoulders 86 and 87. The hollow cylindrical hub 88 of the crank 89 forms the intermediate member of the clutch-casing, the two outer members of said clutch-casing being the cover-plates 90 and 91, which are removably secured to the opposite ends of the hub by screw-bolts 92 and 93, respectively. Cover-plates 90 and 91 are alike and are fitted to turn upon the smooth end-parts of cam-sleeve 81, close to the respective annular shoulders 86 and 87, and are each provided with an oil-seal packing-ring 94. A hardened, smoothly ground sleeve 95 is pressed or otherwise tightly fitted within the hollow hub 88 and held in position by the screw-pin 96 to constitute the outer race for the series of clutch-rollers 97. Clutch-rollers 97 are end-ground and nicely fitted to be kept at right angles to, but move freely between, cage-rings 98 and 99, and are loosely journaled upon the tie-rods 100 which connect said cage-rings, so that the rollers may be floated by the viscosity of the lubricant employed into and from gripping engagement between their respective cam-faces 85 and the outer roller race provided by the sleeve 95, and so that the rollers and roller-cage constitute a removable unit, all as hereinbefore described in connection with the other constructions shown in the drawings. Lubrication is introduced into the roller raceway through oil-hole 101.

It will be seen that all of the clutch-elements are surrounded by the hub 88 and enclosed by cover-plates 90 and 91, and that the close arrangement of the cover-plates to the annular shoulders 86 and 87, respectively, will prevent excessive end play of the clutch-casing. Reciprocal motion of the crank 89 will oscillate the hub 88 and the sleeve 95 forming the outer roller race and effect the alternate wedging and release of the clutch-rollers 97 between their respective cam-faces 85 and the outer race, thereby causing a step-by-step rotation of shaft 82.

In each of the constructions shown, the driving action of the clutch may be reversed by simply removing and reversing the position of the cam-unit.

I claim:

1. In combination with a rotatable shaft, a one-way clutch comprising a sleeve member held in removable splined engagement with said shaft, the outer surface thereof having a centrally disposed band of similarly inclined ratchet-like roller-engaging cam-faces formed thereupon and similar smoothly surfaced end-parts at each side of said band; a cylindrical roller-cage surrounding the band of cam-faces upon said sleeve member; a cylindrical casing member surrounding said roller-cage and having a smooth inner roller-engaging surface; a series of clutch-rollers carried by said roller-cage in position between said members for wedging engagement each with one of the cam-faces of said sleeve member and the smooth inner surface of said casing member; and a cover-plate removably secured to one side of said casing member in rotative engagement with one of the smoothly surfaced end-parts of said sleeve member to assist in holding said members in concentric spaced relationship and to permit said sleeve member to be removed and replaced in reverse position to reverse the rotative action of the clutch, whereupon said cover-plate will rotatively engage the other smoothly surfaced end-part of said sleeve member.

2. The combination with a pair of shafts arranged end-to-end and first and second hubs fixed one upon each of said shafts near the proximate ends thereof, each of said hubs having a series of external splines formed thereupon, of a one-way clutch-coupling comprising a cylindrical sleeve member having an outer roller-engaging surface and a series of internal splines meshing with the splines of said first hub; a hollow cylindrical casing member having an inner roller-engaging surface surrounding the roller-engaging surface of said sleeve member, the roller-engaging surface of one of said members being smooth and the roller-engaging surface of the other of said members comprising a plurality of similarly inclined cam-faces; a cylindrical roller-cage positioned between said members; a plurality of clutch-rollers carried by said roller-cage in position between the roller-engaging surfaces of said members for engagement with the smooth surface of one and the cam-faces of the other; a cover-plate removably secured to one side of said casing member and in free rotative engagement with said first hub; and a cap-plate secured to the other side of said casing member and having a series of internal splines meshing with the splines of said second hub.

3. The combination with a pair of shafts arranged end-to-end and first and second hubs fixed one upon each of said shafts near the proximate ends thereof, each of said hubs having a series of external splines formed thereupon, of a one-way clutch-coupling comprising a cylindrical sleeve member having an outer roller-engaging surface, a series of internal splines meshing with the splines of said first hub, and a plurality of ducts perforating the cylindrical wall thereof at intervals therearound; a hollow cylindrical casing member having an inner roller-engaging surface surrounding the roller-engaging surface of said sleeve member, the roller-engaging surface of one of said members being smooth and the roller-engaging surface of the other of said members comprising a plurality of similarly inclined cam-faces; a cylindrical roller-cage positioned between said members; a plurality of clutch-rollers carried by said roller-cage in position between the roller-engaging surfaces of said members for engagement with the smooth surface of one and the cam-faces of the other; a cover-plate removably secured to one side of said casing member and in free rotative engagement with said first hub; and a cap-plate secured to the other side of said casing member and having a series of internal splines meshing with the splines of said second hub.

4. The combination with a pair of shafts arranged end-to-end and first and second hubs fixed one upon each of said shafts near the proximate ends thereof, each of said hubs having a series of external splines formed thereupon, of a one-way clutch-coupling comprising a cylindrical sleeve member having an outer roller-engaging surface, smooth bearing surfaces one at each side of the roller-engaging surface, and a series of internal splines meshing with the splines of said first hub; a hollow cylindrical casing member having an inner roller-engaging surface surrounding the roller-engaging surface of said sleeve member, the roller-engaging surface of one of said members being smooth and the roller-engaging surface of the other of said members comprising a plurality of similarly inclined cam-faces; a cylindrical roller-cage positioned between said members; a plurality of clutch-rollers carried by said roller-cage in position between the roller-engaging surfaces of said members for engagement with the smooth surface of one and the cam-faces of the other; a cover-plate removably secured to one side of said casing member and in free rotative engagement with said first hub; a cap-plate secured to the other side of said casing member and having a series of internal splines meshing with the splines of said second hub; and annular shouldered bearings engaging the smooth bearing surfaces of said sleeve member, one of said bearings being formed upon said casing member and the other of said bearings being formed upon said cover-plate.

5. The combination with a pair of shafts arranged end-to-end and first and second hubs fixed one upon each of said shafts near the proximate ends thereof, each of said hubs having an undercut annular flange thereupon with a series of splines formed upon the rim thereof, of a one-way clutch-coupling comprising a cylindrical sleeve member having an outer roller-engaging surface and a series of internal splines meshing with the splines of said first hub; a hollow cylindrical casing member having an inner roller-engaging surface surrounding the roller-engaging surface of said sleeve member, the roller-engaging surface of one of said members being smooth and the roller-engaging surface of the other of said members comprising a plurality of similarly inclined cam-faces; a cylindrical roller-cage positioned between said members; a plurality of clutch-rollers carried by said roller-cage in position between the roller-engaging surfaces of said members for engagement with the smooth surface of one and the cam-faces of the other; a cover-plate removably secured to one side of said casing member and having an inwardly turned sleeve, the inner end of which sleeve is provided with a packing ring in free rotative engagement with said first hub within the annular pocket provided by the undercut annular flange thereupon; and a cap-plate secured to the other side of said casing member, having a series of internal splines meshing with the splines of said second hub, and having an inwardly turned sleeve the inner end of which engages said second hub within the annular pocket provided by the undercut annular flange thereupon.

6. The combination with a pair of shafts arranged end-to-end and first and second hubs fixed one upon each of said shafts near the proximate ends thereof, each of said hubs having a series of external splines formed thereupon, of a one-way clutch-coupling comprising a cylindrical sleeve member having a series of similarly inclined roller-engaging cam-faces upon the outer surface thereof and a series of internal splines meshing with the splines of said first hub; a hollow cylindrical casing member having a smooth inner roller-engaging surface surrounding the series of cam-faces of said sleeve member; a cylindrical roller-cage positioned between said members; a plurality of clutch-rollers carried by said roller-cage in position between said members for wedging engagement each with one of the cam-faces of said sleeve member and the smooth inner surface of said casing member; a cover-plate removably secured to one side of said casing member and having a central opening provided with a packing ring fitted to turn upon and form a lubricant seal around said first hub; and a cap-plate secured to the other side of said casing member, having a series of internal splines meshing with the splines of said second hub, and having a central opening engaging said second hub.

7. The combination with a pair of shafts arranged end-to-end and first and second hubs fixed one upon each of said shafts near the proximate ends thereof, each of said hubs having a series of external splines formed thereupon, of a one-way clutch-coupling comprising a cylindrical sleeve member, the outer surface of which is formed with a centrally disposed band of similarly inclined ratchet-like roller-engaging cam-faces and with similar smoothly surfaced end-parts at each side of said band, and the inner surface of which is formed with a series of splines meshing with the splines of said first hub; a cylindrical roller-cage surrounding the band of cam-faces upon said sleeve member; a cylindrical casing member surrounding said roller-cage, having a smooth inner roller-engaging surface and an annular shouldered bearing engaging one of the smoothly surfaced end-parts of said sleeve member; a series of clutch-rollers carried by said roller-cage in position between said members for wedging engagement each with one of the cam-faces of said sleeve member and the smooth inner surface of said casing member; a cover-plate removably secured to one side of said casing member, having an annular shouldered bearing engaging the other of the smoothly surfaced end-parts of said sleeve member, and having a central opening provided with a packing ring fitted to turn upon and form a lubricant seal around said first hub; and a cap-plate secured to the other side of said casing member, having a series of internal splines meshing with the splines of said second hub, and having a central opening engaging said second hub.

8. The combination with a pair of shafts arranged end-to-end and first and second hubs fixed one upon each of said shafts near the proximate ends thereof, each of said hubs having a series of external splines formed thereupon, of a one-way clutch-coupling comprising a cylindrical sleeve member, the outer surface of which is formed with a centrally disposed band of similarly inclined ratchet-like roller-engaging cam-faces and with similar smoothly surfaced bearing faces and ends at each side of said band, and the inner surface of which is formed with a series of splines meshing with the splines of said first hub; a cylindrical roller-cage surrounding the band of cam-faces upon said sleeve member; a cylindrical casing member surrounding said roller-cage, having a smooth inner roller-engaging surface and an annular shouldered bearing engaging one of the smoothly surfaced bearing faces and ends of said sleeve member; a series of clutch-rollers carried by said roller-cage in position between said members for wedging engagement each with one of the cam-faces of said sleeve member and the smooth inner surface of said casing member; a cover-plate removably secured to one side of said casing member, having an annular shouldered bearing engaging the other one of the smoothly surfaced bearing faces and ends of said sleeve member, and having a central opening provided with a packing ring fitted to turn upon and form a lubricant seal around said first hub; and a cap-plate secured to the other side of said casing member, having a series of internal splines meshing with the splines of said second hub, and having a central opening engaging said second hub; said sleeve member being provided with a plurality of ducts through the wall thereof and said cap-plate with a closable opening through the wall thereof for lubrication purposes as described; the construction and arrangement of the parts being such that, upon removal of said cover-plate, said sleeve member may be removed and reversed in position to reverse the rotative action of the clutch-coupling, and said roller-cage and clutch-rollers may be removed and replaced as a unit, without dismantling or disarranging other parts.

JOSEPH A. MARLAND.